US007851406B2

(12) United States Patent
Lee et al.

(10) Patent No.: US 7,851,406 B2
(45) Date of Patent: Dec. 14, 2010

(54) NANO-SIZED PALLADIUM-DOPED CATION EXCHANGE RESIN CATALYST, PREPARATION METHOD THEREOF AND METHOD OF REMOVING DISSOLVED OXYGEN IN WATER USING THE SAME

(75) Inventors: Kew-Ho Lee, Daejeon (KR); Min-Joung Kim, Daejeon (KR); Yeon Kyung Sung, Daejeon (KR); Chang-Yeol Yoo, Cheonan-si (KR)

(73) Assignee: Korea Institute of Chemical Technology, Daejeon (KR)

( * ) Notice: Subject to any disclaimer, the term of this patent is extended or adjusted under 35 U.S.C. 154(b) by 0 days.

(21) Appl. No.: 12/106,087

(22) Filed: Apr. 18, 2008

(65) Prior Publication Data

US 2008/0312068 A1 Dec. 18, 2008

(30) Foreign Application Priority Data

| Jun. 12, 2007 | (KR) | ...................... 10-2007-0057433 |
| Dec. 17, 2007 | (KR) | ...................... 10-2007-0132508 |
| Apr. 18, 2008 | (KR) | ...................... 10-2008-0035948 |

(51) Int. Cl.
  *B01J 23/44* (2006.01)
  *C02F 1/70* (2006.01)
  *B01D 19/00* (2006.01)

(52) U.S. Cl. .................. 502/339; 502/11; 210/757; 96/155

(58) Field of Classification Search .................. 502/11, 502/326, 339; 210/757; 96/155
See application file for complete search history.

(56) References Cited

U.S. PATENT DOCUMENTS

| 537,924 A | 4/1895 | Higgin |
| 550,660 A | 12/1895 | Swift |

(Continued)

FOREIGN PATENT DOCUMENTS

ES    334081    * 10/1967

(Continued)

OTHER PUBLICATIONS

R. D. Wagner and P. M. Lange. The Application of Ion Exchange Catalyst for the Catalytic Removal of Dissolved Oxygen from Water, European Brewery Convention—Symp. Water Brew. Ind. 1988, 14, 90-96.*

*Primary Examiner*—Jennifer K Michener
*Assistant Examiner*—Carlos Barcena
(74) *Attorney, Agent, or Firm*—Fredrikson & Byron, PA

(57) ABSTRACT

Disclosed are a nano-sized palladium-doped anion exchange resin catalyst or palladium-doped cation exchange resin catalyst, a preparation method thereof and a method of removing dissolved oxygen in water using the same. The palladium-doped anion exchange resin catalyst exhibits high dissolved oxygen removal efficiency of 99~99.99%, and the palladium-doped cation exchange resin catalyst exhibits high dissolved oxygen removal efficiency of at least 97%, and further, dissolved oxygen in water can be removed through a catalytic reaction without the use of additional chemicals, thereby discharging no secondary pollutants. This catalyst is environmentally friendly, can be continuously developed, and can prevent the loss of the palladium catalyst, which is expensive, and thus can be efficiently applied to various fields, including semiconductors, power plants, microbial culture, food and pharmaceutical production, and the fermentation industry.

9 Claims, 1 Drawing Sheet

U.S. PATENT DOCUMENTS

| | | | |
|---|---|---|---|
| 4,556,492 A | | 12/1985 | Dickerson et al. |
| 4,574,071 A | * | 3/1986 | DeSilva et al. ............ 422/14 |
| 4,789,488 A | * | 12/1988 | deSilva .................. 210/750 |
| 4,853,135 A | * | 8/1989 | Oeckl et al. ............. 210/757 |
| 6,552,220 B1 | * | 4/2003 | Obana et al. ............. 562/538 |
| 2007/0221581 A1 | * | 9/2007 | Kitami et al. ............ 210/748 |

FOREIGN PATENT DOCUMENTS

| | | | |
|---|---|---|---|
| JP | 1994-154511 A | | 6/1994 |
| KR | 100595529 B1 | | 6/2006 |
| WO | WO 2005/095280 | * | 10/2005 |

* cited by examiner

NANO-SIZED PALLADIUM-DOPED CATION EXCHANGE RESIN CATALYST, PREPARATION METHOD THEREOF AND METHOD OF REMOVING DISSOLVED OXYGEN IN WATER USING THE SAME

RELATED APPLICATIONS

This application claims priority to Korean Patent Application No. KR10-2008-0035948 filed Apr. 18, 2008, and to Korean Patent Application No. 10-2007-0132508 filed Dec. 17, 2007, and to Korean Patent Application No. 10-2007-0057433 filed Jun. 12, 2007, the teachings of all of which are incorporated herein by reference.

BACKGROUND OF THE INVENTION

1. Field of the Invention

The present invention relates to a nano-sized palladium-doped anion exchange resin catalyst or palladium-doped cation exchange resin catalyst, a preparation method thereof and a method of removing dissolved oxygen in water using the same.

2. Description of the Related Art

Dissolved oxygen (DO) is regarded as an important factor that influences water pollution and eutrophication and also determines the successes or failure of biochemical wastewater treatment, microbial culture, the production of semiconductors, food and pharmaceuticals, and the fermentation industry, and thus, techniques for removing DO present in service water are receiving increased attention.

Generally, service water dissolves oxygen from air when in contact with air and thus contains DO of about 8~10 ppm at room temperature. Although the amount of DO present in water at room temperature is not high, when DO-saturated water is used in nuclear power plant systems, it causes the corrosion of metal material for systems and shortens the life span of equipment. As well, the case where an excess of a corrosion product is attached to a heat transfer surface at high temperatures decreases process heat efficiency and entails the danger of explosions and unexpected shutdowns. Hence, in the steam generator system of a nuclear power plant, in order to minimize the corrosion of metal material by DO, the water quality standard for a DO concentration is strictly regulated to about 7~10 ppb.

Semiconductor production is another process in which the product quality is greatly affected by the DO content of service water. Ultrapure water for use in semiconductor production is used as cleaning water after etching of a silicon wafer. As such, in the case where DO is present in semiconductor-cleaning water, even if the concentration thereof is very low, an oxide film spontaneously forms on the surface of a semiconductor device, undesirably deteriorating the device performance. Therefore, with the intention of fabricating semiconductor devices having high quality, there is a need to develop techniques for diminishing the amount of DO in semiconductor-cleaning water. As the degree of integration of semiconductors is increased, the quality of ultrapure water is also required to increase.

Methods of removing DO from industrial water are necessary to ensure the safety and efficiency of the process using ultrapure water as service water and improve the quality of semiconductor products that are exported from Korea, and thus technical research and development therefor is required.

Conventional methods of removing DO in water include mechanical deaeration, reducing agent treatment, and membrane treatment.

The mechanical deaeration method is classified into vacuum deaeration and heat deaeration. The vacuum deaeration method has been mainly employed to date in order to eliminate DO from service water for the steam generator of a nuclear power plant, and the operation principle thereof is to spray service water from the upper portion of a packing column in a vacuum to decrease the partial pressure of gas in the column, thereby eliminating non-condensable gases containing oxygen gas.

The service water treated typically through the vacuum deaeration method is known to contain DO at a concentration ranging from 30 to 40 ppb, but actually contains DO at a concentration higher than the above range due to the inflow of air to a sealing device. Further, a specific sealing device is required in order to maintain the system in a vacuum state, and furthermore, to maintain the vacuum state in the packing column, high device cost and maintenance costs are incurred.

In the heat deaeration method, because gas solubility in water is proportional to the partial pressure of that gas in a gas phase according to Henry's Law, dissolved gas in an aqueous solution may be removed by decreasing the partial pressure of a gas in a gas phase. This method is able to decrease the DO concentration in water to less than 7 ppb through optimal operation of the heat deaerator, but is impossible to apply to a place lacking a steam heat source.

In addition, one effective method for removing DO in water is the use of a reducing agent such as hydrazine. As represented by Reaction 1 below, hydrazine reacts with DO in water, thus producing nitrogen gas and water molecules. Because the nitrogen gas and water molecules, which are products of such a chemical reaction, do not affect the corrosion of metal material, the above method is widely utilized to remove DO.

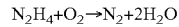

$$N_2H_4 + O_2 \rightarrow N_2 + 2H_2O \qquad \text{Reaction 1}$$

However, the method of removing DO using the reducing agent suffers because the reaction should be conducted only at high water temperatures of at least 80° C., and thus DO is difficult to remove at room temperature, consequently increasing energy consumption, and further, unreacted reducing agent acts as a secondary pollutant.

In addition, Korean Patent No. 595529 discloses a porous membrane which has high porosity and a polar surface by adding a specific amount of alumina through a phase transfer process, and which is doped with a predetermined amount of transition metal selected from among palladium and platinum. The porous membrane is advantageous because the loss of transition metal is lower compared to conventional methods, and hydrogen gas is efficiently supplied through the pores of the porous membrane, thus ensuring process stability. However, the porous membrane brings about low DO removal efficiency of 65%, and therefore, the use thereof is limited in removing DO from service water for semiconductors and power plants requiring high DO removal efficiency.

SUMMARY OF THE INVENTION

Leading to the present invention, intensive and thorough research into the development of catalysts able to effectively remove at least 99% of DO from water at room temperature, carried out by the present inventors, aiming to solve the problems encountered in the related art, resulted in the finding that a nano-sized palladium-doped anion exchange resin catalyst or palladium-doped cation exchange resin catalyst may be prepared by dissolving a palladium precursor at room temperature, dipping an anion exchange resin or a cation exchange resin in the aqueous palladium precursor solution, and then reducing the palladium precursor, and it is confirmed that the above catalyst does not generate secondary pollutants and may effectively remove DO from water at room temperature.

Accordingly, the present invention provides a palladium-doped anion or cation exchange resin catalyst, which exhibits high DO removal efficiency through doping a small amount of palladium.

In addition, the present invention provides a method of preparing the nano-sized palladium-doped anion or palladium-doped cation exchange resin catalyst.

In addition, the present invention provides a method of removing DO in water using the palladium-doped anion or cation exchange resin catalyst.

According to the present invention, an anion exchange resin catalyst may comprise an acrylic or styrene anion exchange resin doped with nano-sized palladium particles.

Also, a cation exchange resin catalyst may comprise a polystyrene or polyacrylic cation exchange resin doped with palladium particles.

In addition, a method of preparing a palladium-doped anion exchange resin catalyst may comprise dissolving a palladium precursor in an acid solution, thus preparing a palladium precursor solution (step 1); dipping an acrylic or styrene anion exchange resin having an amine-based complex or ammonium salt as an ion exchange functional group in the palladium precursor solution prepared in step 1 (step 2); and reducing the palladium precursor doped on the anion exchange resin in step 2 into palladium in the presence of a reducing agent, thus obtaining the anion exchange resin doped with nano-sized palladium particles (step 3).

Also, a method of preparing a palladium-doped cation exchange resin catalyst may comprise dissolving a palladium precursor in water, thus preparing a palladium precursor solution (step 1'); dipping a polystyrene or polyacrylic cation exchange resin in the palladium precursor solution prepared in step 1' (step 2'); and reducing the palladium precursor doped on the cation exchange resin in step 2' into palladium in the presence of a reducing agent, thus obtaining the cation exchange resin doped with palladium particles (step 3').

Further, a method of removing DO in water using the palladium-doped anion or cation exchange resin catalyst may comprise reacting DO in water with hydrogen gas in the presence of the palladium-doped anion or cation exchange resin catalyst, thus converting the DO in water into water.

DESCRIPTION OF THE PREFERRED EMBODIMENTS

Figure 1:
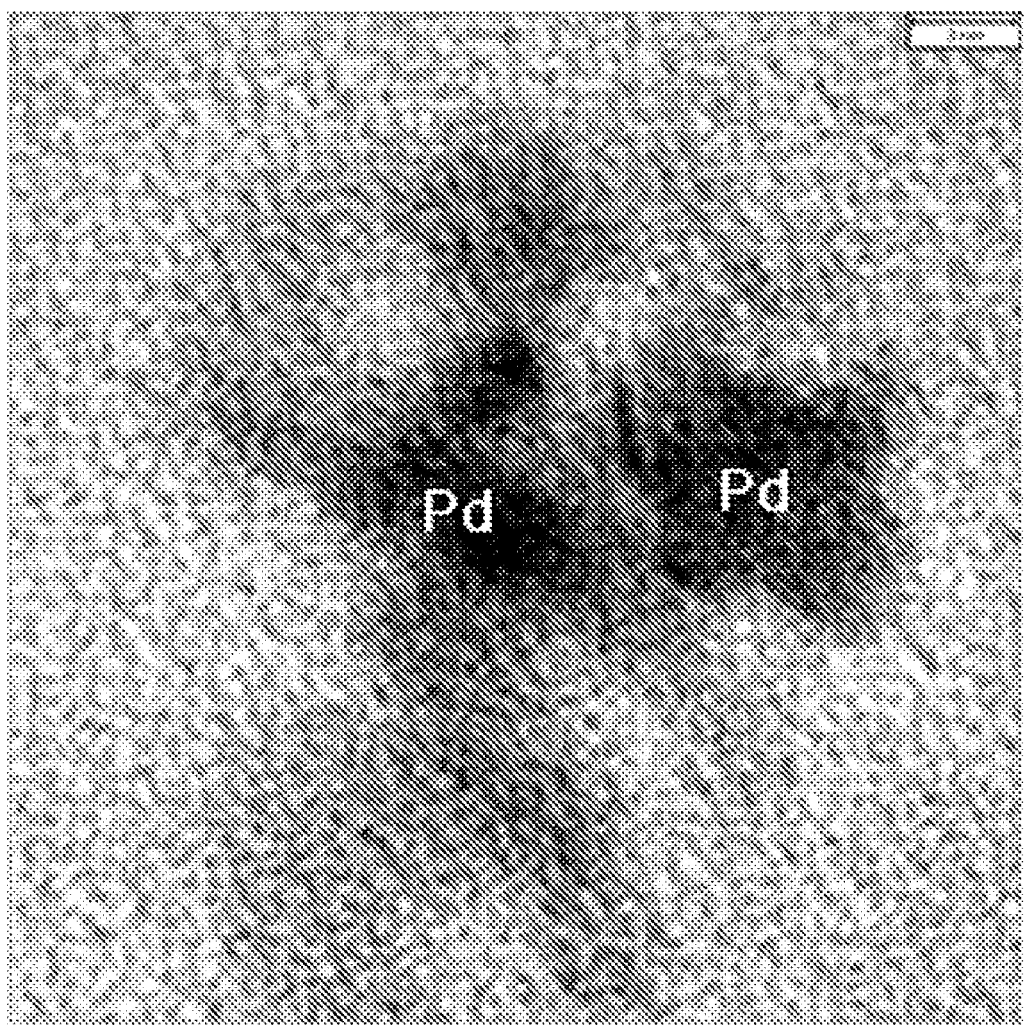
FIG. 1 is a transition electron micrograph illustrating the nano-sized palladium-doped anion exchange resin according to the present invention.

Hereinafter, a detailed description will be given of the present invention.

The present invention provides a nano-sized palladium-doped anion exchange resin catalyst.

The palladium-doped anion exchange resin catalyst according to the present invention is an anion exchange resin doped with nano-sized palladium particles. Examples of the anion exchange resin include, but are not limited to, acrylic or styrene anion exchange resin. Specific examples of the acrylic anion exchange resin include anion exchange resin, which is composed of an acrylic backbone and includes an amine-based complex or ammonium salt as an ion exchange functional group, and specific examples of the styrene anion exchange resin include anion exchange resin, which is composed of a styrene backbone and includes amine or an amine salt as an ion exchange functional group.

In the palladium-doped anion exchange resin catalyst according to the present invention, in the case where the anion exchange resin is an acrylic anion exchange resin, the anion exchange resin is preferably doped with 0.09~0.3 wt % of palladium. When the doped amount is less than 0.09 wt %, the DO removal efficiency is decreased to 99% or lower. In contrast, when the doped amount exceeds 0.3 wt %, preparation costs are undesirably increased, attributable to the use of a large amount of the palladium precursor.

In the palladium-doped anion exchange resin catalyst according to the present invention, in the case where the anion exchange resin is a styrene anion exchange resin, the anion exchange resin is doped with 0.15~2.5 wt % of palladium, and preferably 0.20~0.35 wt % of palladium. When the doped amount is less than 0.15 wt %, the DO removal efficiency is decreased to 99% or lower. In contrast, when the doped amount exceeds 2.5 wt %, preparation costs are undesirably increased, attributable to the use of a large amount of the palladium precursor.

In addition, the present invention provides a method of preparing the nano-sized palladium-doped anion exchange resin catalyst, comprising dissolving a palladium precursor in an acid solution, thus preparing a palladium precursor solution (step 1); dipping an acrylic or styrene anion exchange resin in the palladium precursor solution prepared in step 1 (step 2); and reducing the palladium precursor doped on the anion exchange resin in step 2 into palladium in the presence of a reducing agent, thus obtaining the anion exchange resin doped with the nano-sized palladium particles (step 3).

Below, the method of preparing the nano-sized palladium-doped anion exchange resin catalyst according to the present invention is stepwisely described in more detail.

First, step 1 is a process of preparing the palladium precursor solution.

In the preparation method according to the present invention, as the palladium precursor, any palladium precursor may be used as long as it is typically used in the art. Preferable examples thereof include, but are not limited to, palladium chloride.

The palladium precursor is dissolved in the acid solution, thus preparing an anionic palladium precursor solution. As such, the acid may be selected from among hydrochloric acid, sulfuric acid, nitric acid, and acetic acid, which are typically used in the art, and the concentration thereof varies depending on the type of anion exchange resin.

For example, in the case where the anion exchange resin is an acrylic anion exchange resin, the concentration of the acid solution is preferably set to 0.1~5 M. When the concentration of the acid solution is less than 0.1 M, it is unsuitable for the preparation of the anionic palladium precursor. In contrast, when the concentration exceeds 5 M, the mechanical properties of the anion exchange resin are deteriorated.

On the other hand, in the case where the anion exchange resin is a styrene anion exchange resin, the concentration of the acid solution is preferably set to $1.2 \times 10^{-3}$~5.0 M, and more preferably $3 \times 10^{-3}$~1.0 M. When the concentration of the acid solution is less than $1.2 \times 10^{-3}$ M, it is unsuitable for the preparation of the anionic palladium precursor. In contrast, when the concentration exceeds 5.0 M, the mechanical properties of the anion exchange resin are deteriorated.

The palladium precursor in the anionic palladium precursor solution preferably has a concentration of 0.5~1.5 mM. When the concentration of palladium chloride is less than 0.5 mM, the DO removal efficiency of the resulting palladium-doped anion exchange resin catalyst is decreased to 99% or lower. In contrast, when the concentration exceeds 1.5 mM, the palladium precursor is used in a large amount, thus negating economic benefits.

Next, step 2 is a process of dipping the acrylic or styrene anion exchange resin in the palladium precursor solution prepared in step 1.

In step 2, the palladium precursor solution prepared in step 1 and the anion exchange resin are mixed at a ratio of 1.6:1 and stirred, thereby doping the anion exchange resin with the palladium precursor. Examples of the anion exchange resin include, but are not limited to, acrylic or styrene anion exchange resin, as is mentioned above.

Next, step 3 is a process of reducing the palladium precursor doped on the anion exchange resin in step 2 into palladium in the presence of a reducing agent, thus obtaining the anion exchange resin doped with the palladium particles.

In this step, the palladium precursor doped on the anion exchange resin is reduced into palladium using a reducing agent solution at 20~50° C., thus preparing an anion exchange resin catalyst doped with the palladium particles.

In the preparation method according to the present invention, examples of the reducing agent include, but are not limited to, hydrazine or hydrazine anhydride. The amount of reducing agent that is added may vary depending on the type of anion exchange resin.

In the case where the anion exchange resin is an acrylic anion exchange resin, the reducing agent is preferably used in an aqueous solution phase or a solution phase having a concentration of 0.1~3.5 M. When the amount of reducing agent that is added is less than 0.1 M, the amount of palladium to be reduced is small. In contrast, when the amount of reducing agent that is added exceeds 3.5 M, the mechanical properties of the anion exchange resin are deteriorated.

On the other hand, in the case where the anion exchange resin is a styrene anion exchange resin, the reducing agent is preferably used in an aqueous solution phase or a solution phase having a concentration of 0.5~2.5 M. When the amount of reducing agent that is added is less than 0.5 M, the amount of palladium to be reduced is small. In contrast, when the amount of reducing agent that is added exceeds 2.5 M, the mechanical properties of the anion exchange resin are deteriorated, and preparation costs are increased.

The anion exchange resin catalyst thus prepared can be seen to dope the anion exchange resin with the nano-sized palladium particles, as shown in FIG. 1.

In addition, the present invention provides a palladium-doped cation exchange resin catalyst.

The palladium-doped cation exchange resin catalyst according to the present invention is a cation exchange resin doped with palladium particles. Examples of the cation exchange resin include, but are not limited to, polystyrene or polyacrylic cation exchange resin. Specific examples of the polystyrene cation exchange resin include cation exchange resin, which is composed of a polystyrene backbone and includes sulfonate or sulfonic acid as an ion exchange functional group, and specific examples of the polyacrylic cation exchange resin include cation exchange resin, which is composed of a polyacrylic or polymethacrylic backbone and includes carboxylic acid as an ion exchange functional group.

In the palladium-doped cation exchange resin catalyst according to the present invention, the cation exchange resin is doped with 0.03~2.5 wt % of palladium and preferably 0.03~0.35 wt % of palladium. When the doped amount is less than 0.03 wt %, the DO removal efficiency is decreased to 90% or lower. In contrast, when the doped amount exceeds 2.5 wt %, the palladium precursor is used in a large amount, undesirably increasing preparation costs.

Further, the present invention provides a method of preparing the palladium-doped cation exchange resin catalyst, comprising dissolving a palladium precursor in water, thus preparing a palladium precursor solution (step 1'); dipping a cation exchange resin in the palladium precursor solution prepared in step 1' (step 2'); and reducing the palladium precursor doped on the cation exchange resin in step 2' into palladium in the presence of a reducing agent, thus obtaining the cation exchange resin doped with the palladium particles (step 3').

Below, the method of preparing the palladium-doped cation exchange resin catalyst according to the present invention is stepwisely described in more detail.

First, step 1' is a process of preparing the palladium precursor solution.

In the preparation method according to the present invention, the palladium precursor includes, for example, any palladium precursor which is typically used in the art. Preferable examples thereof include, but are not limited to, dichloroethylenediaminepalladium or palladium chloride.

In the preparation method according to the present invention, the palladium precursor solution may be prepared by dissolving the palladium precursor in water at room temperature.

The preparation method according to the present invention is environmentally friendly because water is used as a solvent, and also, equipment for post-treatment of the used solvent is not needed, resulting in a simplified preparation process. Further, because the palladium precursor is dissolved at room temperature, energy consumption is reduced compared to conventional high-temperature dissolution, ultimately increasing energy efficiency.

In the preparation method according to the present invention, the concentration of the palladium precursor solution may vary depending on the type of palladium precursor that is dissolved.

In the case where the palladium precursor is dichloroethylenediaminepalladium, the concentration of the palladium precursor solution is preferably adjusted in the range of 0.5~2.5 mM, and more preferably 0.8~1.8 mM. When the concentration of the palladium precursor solution is less than 0.5 mM, the amount of the palladium precursor to be doped on the cation exchange resin is small upon preparation of the catalyst, undesirably decreasing DO removal efficiency. In contrast, when the concentration of the palladium precursor solution exceeds 2.5 mM, the palladium precursor is present in an excess amount, undesirably increasing preparation costs. Further, upon preparation of the precursor solution, an additional heat source for dissolving the palladium precursor is required.

On the other hand, in the case where the palladium precursor is palladium chloride, the concentration of the palladium precursor solution is preferably adjusted in the range of 0.2~1.1 mM, and more preferably 0.7~1.0 mM. If the concentration of the palladium precursor solution is less than 0.2 mM, the amount of the palladium precursor to be doped on the cation exchange resin is small upon preparation of the catalyst, undesirably decreasing DO removal efficiency. In contrast, when the concentration of the palladium precursor solution exceeds 1.1 mM, the palladium precursor is present in an excess amount, undesirably increasing preparation costs, and also, an additional heat source for dissolving the palladium precursor is required upon preparation of the precursor solution.

Next, step 2' is a process of dipping the cation exchange resin in the palladium precursor solution prepared in step 1'.

In step 2', the palladium precursor solution prepared in step 1' and the cation exchange resin are mixed at a ratio of 1:1 and stirred, thereby doping the cation exchange resin with the palladium precursor.

Examples of the cation exchange resin include, but are not limited to, polystyrene or polyacrylic cation exchange resin, as is mentioned above.

Next, step 3' is a process of reducing the palladium precursor doped on the cation exchange resin in step 2' into palladium in the presence of a reducing agent, resulting in the cation exchange resin doped with the palladium particles.

In this step, the palladium precursor doped on the cation exchange resin is reduced into palladium using a reducing agent solution at 15~40° C., thus preparing a cation exchange resin catalyst doped with the palladium particles.

In the preparation method according to the present invention, examples of the reducing agent include, but are not limited to, hydrazine, hydrazine anhydride or $NaBH_4$. The amount of the reducing agent that is added may vary depending on the type of palladium precursor.

In the case where the palladium precursor is dichloroethylenediaminepalladium, the reducing agent is preferably used in an amount of 3~30 wt %. When the amount of reducing agent that is added is less than 3 wt %, the amount of palladium to be reduced is small and the reaction time is increased. In contrast, when the amount of reducing agent that is added exceeds 30 wt %, preparation costs are undesirably increased due to the excessive addition of the reducing agent.

On the other hand, in the case where the palladium precursor is palladium chloride, the reducing agent is preferably used in an amount of 5~25 wt %. When the amount of reducing agent that is added is less than 5 wt %, the amount of palladium to be reduced is small and the reaction time is lengthened. In contrast, when the amount of reducing agent that is added exceeds 25 wt %, preparation costs are increased due to the excessive addition of the reducing agent.

In addition, the present invention provides a method of removing DO in water using the palladium-doped anion or cation exchange resin catalyst.

The palladium-doped anion or cation exchange resin catalyst according to the present invention is packed in a column reactor, DO-containing water is circulated therein, and hydrogen gas is pressurized. Then, DO in water is subjected to a catalytic reaction with hydrogen gas in the presence of the palladium catalyst and is thus converted into water, thereby removing DO. The DO removal efficiency is 99~99.99% in the presence of the palladium-doped anion exchange resin catalyst, or at least 97% in the presence of the palladium-doped cation exchange resin catalyst (Table 4).

Hence, the palladium-doped anion or cation exchange resin according to the present invention is very useful for the removal of DO in various fields, including semiconductors, power plants, microbial culture, food and pharmaceutical production, and the fermentation industry.

A better understanding of the present invention may be obtained in light of the following examples, which are set forth to illustrate, but are not to be construed to limit the present invention.

EXAMPLE 1

Preparation of Palladium-Doped Anion Exchange Resin Catalyst 1

1 mM palladium chloride was dissolved in a 0.5 M aqueous hydrochloric acid solution, thus preparing an anionic palladium precursor solution. Hydrazine was dissolved in ultrapure water, thus preparing a 1.0 M aqueous hydrazine solution. 150 g of an acrylic anion exchange resin was added to 250 g of the palladium precursor solution, the reaction mixture was allowed to react at 40° C. for 30 min, and then the reaction product was filtered and washed with ultrapure water, thus preparing a palladium-doped anion exchange resin.

Using EDS, the palladium-doped anion exchange resin was observed. As a result thereof, it could be seen that palladium was provided on the anion exchange resin. The doped amount of palladium was determined through ICP.

EXAMPLES 2~4

Preparation of Palladium-Doped Anion Exchange Resin Catalyst 2

A palladium-doped anion exchange resin was prepared in the same manner as in Example 1, with the exception that the amount of anion exchange resin, the type of palladium precursor, the concentration of the palladium precursor solution, and the concentration of the hydrazine solution were changed, as shown in Table 1 below.

COMPARATIVE EXAMPLE 1

Preparation of Palladium-Doped Anion Exchange Resin Catalyst 3

A palladium-doped anion exchange resin was prepared in the same manner as in Example 1, with the exception that the amount of anion exchange resin, the type of palladium precursor, the concentration of the palladium precursor solution, and the concentration of the hydrazine solution were changed, as shown in Table 1 below.

TABLE 1

| | Anion Exchange Resin, Amount (g) | Palladium Precursor, Solution Concent. (mM) | Aq. Hydrazine Concent. (M) | Doped Palladium (wt %) |
|---|---|---|---|---|
| Ex. 1 | Acryl, 150 | Palladium Chloride, 1.0 | 1.0 | 0.17 |
| Ex. 2 | Acryl, 150 | Palladium Chloride, 0.5 | 1.0 | 0.09 |
| Ex. 3 | Acryl, 150 | Palladium Chloride, 1.25 | 0.8 | 0.21 |
| Ex. 4 | Acryl, 150 | Palladium Chloride, 1.25 | 1.0 | 0.22 |
| C. Ex. 1 | Acryl, 150 | Palladium Chloride, 0.25 | 1.0 | 0.05 |

COMPARATIVE EXAMPLE 2

A commercially available homogeneous palladium catalyst (doped with 3 wt % of palladium) was used.

COMPARATIVE EXAMPLE 3

A palladium catalyst-doped porous membrane was manufactured using the process of Example 4 disclosed in Korean Patent No. 595529.

EXAMPLE 5

Preparation of Palladium-Doped Anion Exchange Resin Catalyst 4

Palladium chloride was dissolved in a $1.2 \times 10^{-3}$ M aqueous hydrochloric acid solution, thus preparing a 1 mM palladium precursor solution. Hydrazine was dissolved in ultrapure water, thus preparing a 1.0 M aqueous hydrazine solution. Thereafter, 450 g of a styrene anion exchange resin was added to 750 g of the palladium precursor solution, the reaction mixture was allowed to react at 40° C. for 30 min, and then the reaction product was filtered and washed with ultrapure water, thus preparing a palladium-doped anion exchange resin.

The palladium-doped anion exchange resin was observed using EDS, and as a result thereof, it could be seen that palladium was provided on the anion exchange resin. The doped amount of palladium was determined through ICP.

EXAMPLES 6~9

Preparation of Palladium-Doped Anion Exchange Resin Catalyst 5

A palladium-doped anion exchange resin was prepared in the same manner as in Example 4, with the exception that the amount of anion exchange resin, the type of palladium precursor, the concentration of the palladium precursor solution, and the concentration of the hydrazine solution were changed, as shown in Table 2 below.

COMPARATIVE EXAMPLE 4

Preparation of Palladium-Doped Anion Exchange Resin Catalyst 6

A palladium-doped anion exchange resin was prepared in the same manner as in Example 4, with the exception that the type of styrene anion exchange resin, the concentration of hydrochloric acid upon preparation of the palladium precursor, and the concentration of the hydrazine solution were changed, as shown in Table 2 below.

EXAMPLE 10

Preparation of Palladium-Doped Cation Exchange Resin Catalyst 1

As a palladium precursor, dichloroethylenediaminepalladium was dissolved in water at room temperature for 30 min, thus preparing a 1 mM dichloroethylenediaminepalladium solution. Then, 250 g of a polystyrene cation exchange resin and 250 g of the dichloroethylenediaminepalladium solution were mixed and stirred at 40° C. for 12 hours, thus doping the cation exchange resin with dichloroethylenediaminepalladium. Then, 250 g of a 5.01 wt % aqueous hydrazine monohydrate solution was added thereto, after which the reaction was performed at 40° C. for 85 min, and then the reaction product was filtered and washed with ultrapure water, thus preparing a palladium-doped cation exchange resin catalyst.

EXAMPLE 11

Preparation of Palladium-Doped Cation Exchange Resin Catalyst 2

As a palladium precursor, palladium chloride was dissolved in water at room temperature for 30 min, thus preparing a 1 mM palladium chloride solution. Then, 250 g of a polyacrylic cation exchange resin and 250 g of the palladium chloride solution were mixed and stirred at 40° C. for 4 hours, thus doping the cation exchange resin with palladium chloride. Then, 250 g of a 5.01 wt % aqueous hydrazine monohydrate solution was added thereto, after which the reaction was performed at 40° C. for 3 hours, and then the reaction product was filtered and washed with ultrapure water, thus preparing a palladium-doped cation exchange resin catalyst.

EXAMPLE 12

Preparation of Palladium-Doped Cation Exchange Resin Catalyst 3

As a palladium precursor, dichloroethylenediamine palladium was dissolved in water at room temperature for 30 min, thus preparing a 1 mM dichloroethylenediaminepalladium solution. Then, 300 g of a polyacrylic cation exchange resin and 300 g of the dichloroethylenediaminepalladium solution were mixed and stirred at 40° C. for 24 hours, thus doping the cation exchange resin with dichloroethylenediaminepalladium. Then, 300 g of a 5.01 wt % aqueous hydrazine monohydrate solution was added thereto, after which the reaction was performed at 40° C. for 12 hours, and then the reaction

TABLE 2

| | Anion Exchange Resin | Palladium Precursor, Solution Concent. (mM) | Aq. Hydrazine Concent. (M) | Aq. Hydrochloric Acid Concent. (M) | Doped Palladium (wt %) |
|---|---|---|---|---|---|
| Ex. 5 | Styrene 1 | Palladium Chloride, 1 | 1.0 | $1.2 \times 10^{-3}$ | 0.21 |
| Ex. 6 | Styrene 1 | Palladium Chloride, 1 | 1.0 | $3.0 \times 10^{-3}$ | 0.30 |
| Ex. 7 | Styrene 2 | Palladium Chloride, 1 | 1.0 | $3.0 \times 10^{-3}$ | 0.05 |
| Ex. 8 | Styrene 1 | Palladium Chloride, 1 | 1.0 | 0.5 | 0.21 |
| Ex. 9 | Styrene 2 | Palladium Chloride, 1 | 1.0 | 2.0 | 0.22 |
| C. Ex. 4 | Lewatit K7333 | — | — | — | 2.5 |

1) Styrene 1 - ion exchange amount: 1.3 meq/ml, water content: 39~44%, gel type
2) Styrene 2 - ion exchange amount: 1.1 meq/ml, water content: 46~52%, porous type product was filtered and washed with ultrapure water, thus preparing a palladium-doped cation exchange resin catalyst.

EXAMPLE 13

Preparation of Palladium-Doped Cation Exchange Resin Catalyst 4

As a palladium precursor, palladium chloride was dissolved in water at room temperature for 30 min, thus preparing a 0.8 mM palladium chloride solution. Then, 250 g of a polystyrene cation exchange resin and 250 g of the palladium chloride solution were mixed and stirred at 40° C. for 24 hours, thus doping the cation exchange resin with palladium chloride. Then, 250 g of a 5.01 wt % aqueous hydrazine monohydrate solution was added thereto, after which the reaction was performed at 40° C. for 12 hours, and then the reaction product was filtered and washed with ultrapure water, thus preparing a palladium-doped cation exchange resin catalyst.

The materials used in Examples 10~13 are summarized in Table 3 below.

TABLE 3

| | Cation Exchange Resin | Palladium Precursor | Palladium Precursor Concent. (mM) | Reducing Agent | Reducing Agent Concent. (wt %) | Doped Palladium (wt %) |
|---|---|---|---|---|---|---|
| Ex. 10 | Polystyrene | Dichloroethylene-diaminepalladium | 1 | Hydrazine Monohydrate | 5.01 | 0.029 |
| Ex. 11 | Polyacryl | Palladium Chloride | 1 | Hydrazine Monohydrate | 5.01 | 0.029 |
| Ex. 12 | Polyacryl | Dichloroethylene-diaminepalladium | 1 | Hydrazine Monohydrate | 5.01 | 0.029 |
| Ex. 13 | Polystyrene | Palladium Chloride | 0.8 | Hydrazine Monohydrate | 5.01 | |

EXPERIMENTAL EXAMPLE 1

Measurement of DO Removal Efficiency

In a continuous column reactor, 200 g of DO-saturated water and 80 g of the palladium-doped ion exchange resin catalyst of each of Examples 1~13 and Comparative Examples 1~4 were packed, water was circulated in the reactor, and then hydrogen was injected at 40 psig into the reactor, after which a catalytic reaction to remove DO was conducted at 20° C. for 4 hours. After 4 hours, the DO removal efficiency was measured. The results are shown in Table 4 below. The initial DO concentration was determined to be 7.5 ppm, and the change in the amount of DO was measured using a DO meter. The DO removal efficiency was calculated using Equation 1 below.

DO Removal Efficiency (%)=(1−(residual DO concentration/initial DO concentration))×100    Equation 1

TABLE 4

| | Initial DO (ppm) | Residual DO (ppb) | DO Removal Efficiency (%) |
|---|---|---|---|
| Ex. 1 | 7.5 | 0.7 | 99.99 |
| Ex. 2 | 7.5 | 24 | 99.68 |
| Ex. 3 | 7.5 | 3.2 | 99.96 |
| Ex. 4 | 7.5 | 1.6 | 99.98 |
| Ex. 5 | 7.5 | 9.9 | 99.86 |
| Ex. 6 | 7.5 | 2.8 | 99.96 |
| Ex. 7 | 7.5 | 4.1 | 99.94 |
| Ex. 8 | 7.5 | 4.9 | 99.93 |
| Ex. 9 | 7.5 | 3.8 | 99.95 |
| Ex. 10 | 7.5 | 8.46 | 99.89 |
| Ex. 11 | 7.5 | 11.8 | 99.84 |
| Ex. 12 | 7.5 | 19.6 | 99.74 |
| Ex. 13 | 7.5 | 160 | 97.87 |
| C. Ex. 1 | 7.5 | 130 | 98.27 |
| C. Ex. 2 | 7.5 | 2.66 | 99.96 |
| C. Ex. 3 | 7.5 | 2625 | 65 |
| C. Ex. 4 | 7.5 | 2.8 | 99.96 |

As is apparent from Table 4, the DO removal efficiencies of the palladium-doped anion or cation exchange resin catalysts according to the present invention were compared, demonstrating a high DO removal efficiency of at least 97%. Thus, the palladium-doped anion or cation exchange resin catalyst of the present invention can be effectively used as a DO removal catalyst.

As described hereinbefore, the present invention provides a nano-sized palladium-doped anion exchange resin catalyst or palladium-doped cation exchange resin catalyst, a preparation method thereof, and a method of removing DO in water using the same. According to the present invention, the nano-sized palladium-doped anion exchange resin catalyst can exhibit high DO removal efficiency of 99~99.99%, and the palladium-doped cation exchange resin catalyst can manifest high DO removal efficiency of at least 97%. Further, because the removal of DO in water is possible through a catalytic reaction without the use of additional chemicals, no secondary pollutants are discharged. Thus, this catalyst is environmentally friendly, can be continuously developed, and can prevent the loss of the palladium catalyst, which is expensive.

Also, in the palladium-doped cation exchange resin catalyst according to the present invention, because water is used as a solvent for the preparation of a palladium precursor solution, there is no need to use an organic solvent or an acid solution as the solvent, thus realizing environmentally friendly properties and a simple preparation process. In the preparation of the palladium precursor solution, energy consumption can be reduced, resulting in improved energy efficiency in terms of the preparation process.

Therefore, the palladium-doped anion or cation exchange resin catalyst according to the present invention is suitable for the removal of DO from semiconductor-cleaning water and water for secondary systems of a nuclear power plant, in which the DO concentration in water must be strictly maintained at 10 ppb or lower, and also, can be usefully applied to various fields, including microbial culture, food and pharmaceutical production, and the fermentation industry.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A palladium-doped cation exchange resin catalyst comprising a polyacrylic cation exchange resin or a polymethacrylic cation exchange resin which is doped with 0.03-2.5 wt % nano-sized palladium particles.

2. A method of preparing a palladium-doped cation exchange resin catalyst of claim 1, comprising:
   dissolving a palladium precursor in water, thus preparing a palladium precursor solution (step 1');
   dipping a polyacrylic cation exchange resin or a polymethacrylic cation exchange resin in the palladium precursor solution prepared in step 1'(step 2'); and
   reducing the palladium precursor doped on the cation exchange resin in step 2' into palladium in presence of a reducing agent, thus obtaining the cation exchange resin doped with palladium particles (step 3').

3. The method as set forth in claim 2, wherein the palladium precursor is dichloroethylenediaminepalladium or palladium chloride.

4. The method as set forth in claim 2, wherein, when the palladium precursor is dichloroethylenediaminepalladium, the palladium precursor solution has a concentration adjusted in a range of 0.5~2.5 mM.

5. The method as set forth in claim 2, wherein, when the palladium precursor is palladium chloride, the palladium precursor solution has a concentration adjusted in a range of 0.2~1.1 mM.

6. The method as set forth in claim 2, wherein the reducing agent is hydrazine, hydrazine anhydride or $NaBH_4$.

7. The method as set forth in claim 2, wherein, when the palladium precursor is dichloroethylenediaminepalladium, the reducing agent is used in an amount of 3~30 wt % and when the palladium precursor is palladium chloride, the reducing agent is used in an amount of 5~25 wt %.

8. A method of removing dissolved oxygen in water using the palladium-doped cation exchange resin catalyst of claim 1.

9. The method as set forth in claim 8, wherein the removing the dissolved oxygen is conducted by reacting the dissolved oxygen in water with hydrogen gas in presence of the palladium-doped cation exchange resin catalyst, thus converting the dissolved oxygen in water into water.

* * * * *